US012683438B2

(12) United States Patent
Satou et al.

(10) Patent No.: US 12,683,438 B2
(45) Date of Patent: Jul. 14, 2026

(54) ROTARY ELECTRIC MACHINE

(71) Applicant: Proterial, Ltd., Tokyo (JP)

(72) Inventors: Daisuke Satou, Tokyo (JP); Yuji Enomoto, Tokyo (JP); Ryouichi Takahata, Tokyo (JP); Hirohisa Sano, Tokyo (JP); Yasuhiro Marukawa, Tokyo (JP)

(73) Assignee: Proterial, Ltd., Tokyo (JP)

( * ) Notice: Subject to any disclaimer, the term of this patent is extended or adjusted under 35 U.S.C. 154(b) by 180 days.

(21) Appl. No.: 18/841,188

(22) PCT Filed: Dec. 28, 2022

(86) PCT No.: PCT/JP2022/048640
§ 371 (c)(1),
(2) Date: Aug. 23, 2024

(87) PCT Pub. No.: WO2023/171103
PCT Pub. Date: Sep. 14, 2023

(65) Prior Publication Data
US 2025/0167602 A1      May 22, 2025

(30) Foreign Application Priority Data

Mar. 9, 2022      (JP) ................................. 2022-035984

(51) Int. Cl.
*H02K 1/16*          (2006.01)
*H02K 1/2706*        (2022.01)

(52) U.S. Cl.
CPC .............. *H02K 1/16* (2013.01); *H02K 1/2706* (2013.01)

(58) Field of Classification Search
CPC .......... H02K 1/16; H02K 1/2706; H02K 1/14; H02K 1/146; H02K 1/148; H02K 21/16; Y02T 10/64

(Continued)

(56) References Cited

U.S. PATENT DOCUMENTS 3,257,572 A * 6/1966 Heilmann .............. H02K 17/12
                                                    310/216.099
3,643,118 A * 2/1972 Ichiki ..................... H02K 23/42
                                                    310/179

(Continued)

FOREIGN PATENT DOCUMENTS

JP       H08-098487 A      4/1996
JP       H09-056133 A      2/1997

(Continued)

OTHER PUBLICATIONS

International Search Report, PCT/JP2022/048640, Mar. 14, 2023, 2 pgs.

*Primary Examiner* — Charles Reid, Jr.
(74) *Attorney, Agent, or Firm* — Volpe Koenig

(57) ABSTRACT

A single-phase AC rotary electric machine is provided that eliminates the return coil (return line) and can widen a space where a coil within a slot can be disposed and includes: a rotor; and a stator disposed such that a gap G in a radial direction is present between the rotor and the stator. The rotor includes a plurality of magnets forming rotor magnetic poles N and S disposed in a circumferential direction. The stator includes a stator iron core, a plurality of teeth disposed in the stator iron core, and coils wound around the teeth. The tooth includes branched portions whose distal end side facing the rotor magnetic poles N and S is branched plurally, and in the distal portions of the branched portions branched plurally, two distal portions adjoining each other are apart from each other by one pole portion of the rotor magnetic poles N and S.

10 Claims, 10 Drawing Sheets

(58) Field of Classification Search
USPC ........................................................ 310/179
See application file for complete search history.

(56) References Cited

U.S. PATENT DOCUMENTS

| | | | | | |
|---|---|---|---|---|---|
| 4,038,575 | A | * | 7/1977 | Nordebo | ................ H02K 19/24 |
| | | | | | 310/179 |
| 4,752,707 | A | * | 6/1988 | Morrill | .................. H02K 17/16 |
| | | | | | 310/179 |
| 4,851,758 | A | * | 7/1989 | Osada | .................... H02K 19/26 |
| | | | | | 310/40 MM |
| 5,889,347 | A | * | 3/1999 | Tang | .................... H02K 19/103 |
| | | | | | 310/168 |
| 5,936,325 | A | * | 8/1999 | Permuy | .................. H02K 19/06 |
| | | | | | 310/179 |
| 6,160,330 | A | * | 12/2000 | Sakamoto | ................. H02P 8/32 |
| | | | | | 310/179 |
| RE37,576 | E | * | 3/2002 | Stephens | ................. F23N 1/062 |
| | | | | | 310/156.01 |
| 6,448,680 | B1 | | 9/2002 | Akemakou | |
| 2003/0080643 | A1 | * | 5/2003 | Kusase | .................. H02K 19/28 |
| | | | | | 310/179 |
| 2009/0134734 | A1 | | 5/2009 | Nashiki | |

FOREIGN PATENT DOCUMENTS

| | | | |
|---|---|---|---|
| JP | H09-093890 | A | 4/1997 |
| JP | 2002-534044 | A | 10/2002 |
| JP | 2008-061485 | A | 3/2008 |
| JP | 2019-103295 | A | 6/2019 |
| WO | 2007/010934 | A1 | 1/2007 |

* cited by examiner

ROTARY ELECTRIC MACHINE

TECHNICAL FIELD

The present invention relates to a rotary electric machine, and relates specifically to a single-phase AC rotary electric machine.

BACKGROUND ART

In the paragraph 0037 and FIG. 3 of Patent Literature 1, there is described an 8-pole single-phase AC motor including a stator magnetic pole, a winding imparting a magnetomotive force to the stator magnetic pole, and a permanent magnet of a rotor. The winding includes a winding (first winding portion) disposed within a slot of the stator on one side with respect to the magnetic pole in the circumferential direction of the stator and a winding (second winding portion) disposed in a space of the outside of the stator on the other side with respect to the magnetic pole, and the second winding portion is configured as a return line of the current of the first winding portion.

Also, in the paragraph 0040 and FIG. 6 of Patent Literature 1, there is described a 12-pole single-phase AC motor including a first stator including two stator magnetic poles, and a second stator including two stator magnetic poles and disposed so that the electrical phase angle differs by 180 degrees with respect to the first stator.

The wiring is so configured that the first wiring portion is disposed within the slot of the first stator and the second wiring portion is disposed within the slot of the second stator. According to this configuration, there is no event that the second wiring portion is configured as the return line of the current of the first wiring portion, so that the return line can be eliminated, the wiring amount is reduced, and the copper loss as a motor can be reduced.

CITATION LIST

Patent Literature

Patent Literature 1: WO 2007-010934

SUMMARY OF INVENTION

Technical Problem

With reference to the rotary electric machine of Patent Literature 1, since the stator magnetic poles are disposed so that the current direction of the wiring stored in the slot of the adjoining stator becomes opposite to each other, it is required to dispose the stator magnetic pole of the first stator and the stator magnetic pole of the second stator adjoining the stator magnetic pole of the first stator to be apart by one pole portion of the rotor magnetic pole. In this case, the first stator and the second stator having been divided are apart from each other by one pole portion of the rotor magnetic pole, and a space where the wiring within the slot can be disposed becomes narrow by that portion. When the space where the wiring is disposed became narrow, there was a problem that the winding number of the winding was restricted, the cross-sectional area of the wiring was restricted, and the copper loss increased.

The stator, the rotor, and the wiring will be hereinafter referred to as the stator, rotor, and coil, respectively, in the explanation.

An object of the present invention is to provide a single-phase AC rotary electric machine that eliminates the return coil (return line) and can widen a space where a coil within a slot can be disposed.

Objects, configurations, and effects other than the above will be apparent from the description of the following embodiments.

Solution to Problem

In order to achieve the above object, a single-phase AC rotary electric machine of the present invention includes: a rotor; and a stator which is disposed such that a gap in a radial direction is present between the rotor and the stator. In the rotary electric machine, the rotor includes a plurality of magnets forming rotor magnetic poles disposed in a circumferential direction, the stator includes a stator iron core, a plurality of teeth disposed in the stator iron core, and coils wound around the teeth, the tooth includes branched portions whose distal end side facing the rotor magnetic poles is branched plurally in the circumferential direction, and in the distal portions of the branched portions branched plurally, two distal portions adjoining each other in the circumferential direction are apart from each other by one pole portion of the rotor magnetic poles.

Advantageous Effects of Invention

According to the present invention, it is possible to provide a single-phase AC rotary electric machine that eliminates the return coil (return line) and can widen a space where a coil within a slot can be disposed.

DESCRIPTION OF EMBODIMENTS

With respect to a single-phase AC motor, since the drive circuit can be configured simple compared to a three-phase AC motor, the single-phase AC motor is used for a product such as a handy cleaner requiring a motor small in size and light in weight. Since the motor output depends on the loss and the cooling performance when the motor is driven, in order to increase the motor output, reduction of the loss and improvement of the cooling performance are required. As a loss reduction structure of the single-phase AC motor, there is a structure eliminating the return line of the coil. With respect to the structure eliminating the return line, there is one described in Patent Literature 1 as described above.

According to the present embodiment, by forming the teeth having the distal end thereof being branched into two portions apart from each other by one pole portion of the rotor magnetic poles, each distal end of the teeth functions as a stator magnetic pole. On the other hand, the root of the teeth is not required to be apart by one pole portion of the rotor magnetic pole, the space where the coil can be disposed becomes wide, the stretch length of the coil is shortened, and therefore the copper loss of the rotary electric machine can be reduced. Also, with respect to the ventilation path formed between the distal ends of the teeth, since the ventilation path is narrow compared to a structure where the stator cores are apart from each other, the flow speed of the cooling air increases, the percentage of the region close to the rotor increases, therefore the effect of the rotor becomes high, the cooling air is made turbulent by rotation, and cooling performance can be improved.

As a result, according to the present embodiment, by eliminating the return coil (return line) and widening the space within the slot where the coil can be disposed, the copper loss can be reduced. Also, it is possible to provide a single-phase AC rotary electric machine whose cooling performance is improved by making the cooling air turbulent by narrowing the ventilation path and increasing the effect of rotation.

Embodiments of the rotary electric machine will be hereinafter explained using the drawings.

First Embodiment

Figure 1:
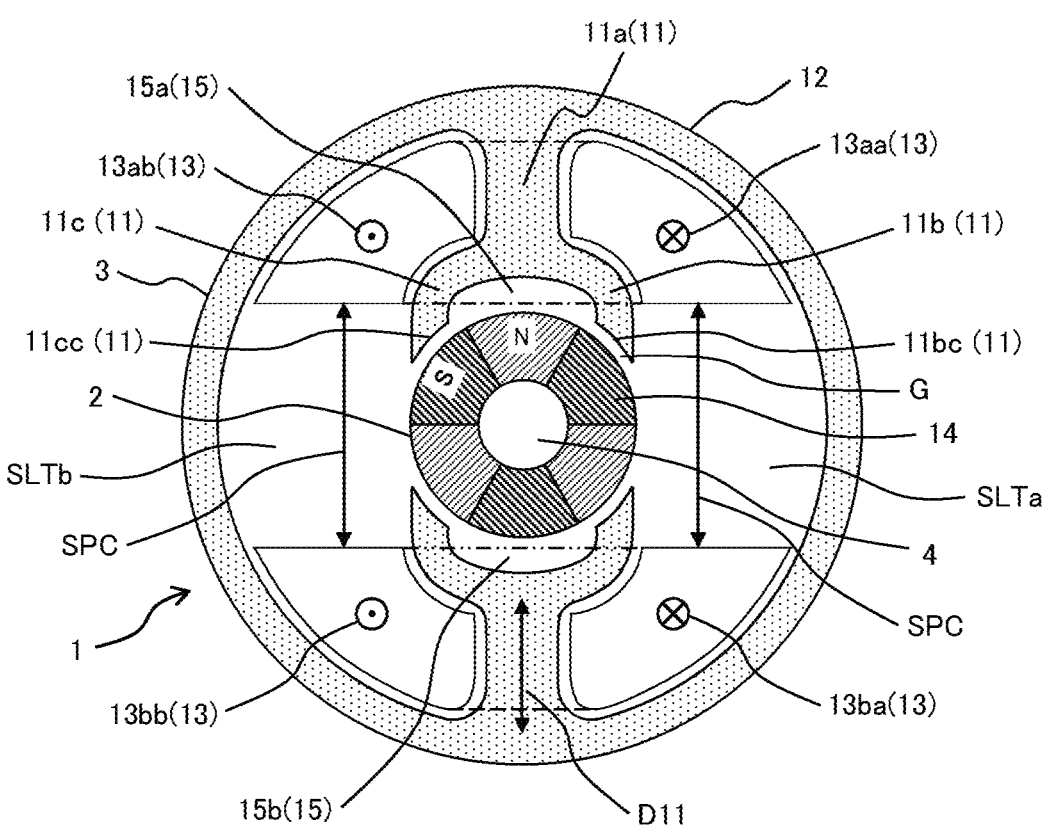
FIG. 1 is a cross-sectional view of a rotary electric machine related to a first embodiment of the present invention.

FIG. 1 illustrates a cross-sectional view of a rotary electric machine 1 related to the first embodiment of the present invention.

The rotary electric machine 1 is a radial gap type rotary electric machine including a rotor 2 and a stator 2. The stator 2 is disposed such that a gap G having a predetermined gap length is interposed between the rotor 2 and the stator in the radial direction. Also, the rotary electric machine 1 is a single-phase AC rotary electric machine.

The rotor 2 includes a shaft 4 and magnets 14 disposed on the outer circumference of the shaft 4. The stator 3 includes teeth 11 disposed by a plural number in a stator iron core 12, and coils 13 wound around the outer circumference of the teeth 11. According to the present embodiment, the rotor 2 is disposed on the inner circumference side of the stator 3. The teeth 11 are arranged on the inner circumference side of the stator iron core 12, and face rotor magnetic poles configured on the outer circumference surface of the rotor 2.

The teeth 11 include branched portions 11b, 11c whose distal end sides facing rotor magnetic poles N, S are branched into a plural number in the circumferential direction. With respect to the distal end portion of the branched portions 11b, 11c branched into a plural number, two distal end portions 11bc, 11cc adjoining each other in the circumferential direction are apart from each other by one pole portion of the rotor magnetic pole N, S. According to the present embodiment, the two teeth 11 are arranged. In each teeth 11, a root portion 11a on the outer circumferential side is formed of one teeth portion, and the distal end side is branched into two distal end portions 11bc, 11cc which are apart from each other by one pole portion of the rotor magnetic poles.

In the stator iron core 12, there are configured four slots in total by two slots SLTa, SLTb arranged between two teeth 11 and two slots 15a, 15b arranged between two branched portions 11b, 11c. Therefore, the rotary electric machine 1 of the present embodiment becomes a rotary electric machine of 6 poles and 4 slots.

However, the coil 13 is not disposed in two slots 15a, 15b configured between the distal ends of the teeth 11 having been branched, and is disposed only on the outer circumference of the teeth 11. As a result, the branched distal end portions 11bc, 11cc of each of the teeth 11 function as separate stator magnetic poles. According to the present embodiment, by the two teeth 11, the number of piece of the magnetic pole on the stator 3 side becomes four poles.

Coils 13aa, 13ab are wound around one tooth out of two teeth 11 as one set (one piece) of coil, and coils 13ba, 13bb are wound around the other tooth as one set (one piece) of coil. The coil 13aa disposed on one side end side in the circumferential direction with respect to one tooth and the coil 13ab disposed on the other side end side are wound around the teeth 11 so that the current flow direction becomes opposite to each other. Also, the coil 13ba disposed on one side end side in the circumferential direction with respect to the other tooth and the coil 13bb disposed on the other side end side are wound around the teeth 11 so that the current flow direction becomes opposite to each other.

In this case, the coil 13aa included in one coil 13aa, 13ab and the coil 13ba included in the other coil 13ba, 13bb are stored in the same slot SLTa. Also, the coil 13ab included in one coil 13aa, 13ab and the coil 13bb included in the other coil 13ba, 13bb are stored in the same slot SLTb. A space SPC in the circumferential direction is formed between the coil 13aa and the coil 13ba stored in the same slot SLTa, and a space SPC in the circumferential direction is formed between the coil 13ab and the coil 13bb stored in the same slot SLTb.

The space SPC is formed in a range where the coil 13 is not wound. One dot chain line and two dot chain line of FIG. 1 illustrate the winding range of the coil 13. The coils 13aa, 13ab are wound on the upper side of the one dot chain line of FIG. 1, and the coils 13ba, 13bb are wound on the lower side of the two dot chain line of FIG. 1. Thus, the space SPC is formed between the coil 13aa and the coil 13ba and between the coil 13ab and the coil 13bb, respectively. When the coils 13aa, 13ab are wound to a position of overlapping with the rotor 2 beyond the one dot chain line, or when the coils 13ba, 13bb are wound to a position of overlapping with the rotor 2 beyond the two dot chain line, the rotor 2 cannot be assembled to the inside of the stator iron core 12 after the coils 13aa, 13ab and the coils 13ba, 13bb are wound around the stator iron core 12 to assemble the stator 3. Therefore, it is required to secure the space SPC so that the distance illustrated by an arrow SPC becomes larger than the diameter of the rotor 2. Also, the rotary electric machine 1 is manufactured by that the stator 3 wound with the coil 13 is assembled to a housing not illustrated, and the rotor 2 is thereafter assembled to the stator 3.

As described above, the rotary electric machine 1 of the present embodiment is the single-phase AC rotary electric machine 1 including the rotor 2 and the stator 3, the stator 3 being disposed such that a gap in a radial direction is present between the rotor and the stator. The rotor 2 includes a plurality of magnets 14 forming rotor magnetic poles N, S disposed in the circumferential direction, and the stator 3 includes a stator iron core 12, a plurality of teeth 11 disposed on the stator iron core 12, and coils 13 wound around the teeth 11. The teeth 11 include a plurality of branched portions 11b, 11c whose distal end side facing the rotor magnetic poles N, S is plurally branched in the circumferential direction, and two distal end portions 11bc, 11cc adjoining each other in the circumferential direction of the branched portions 11b, 11c branched plurally are apart from each other by one pole portion of the rotor magnetic poles N, S. That is to say, two distal end portions 11bc, 11cc adjoining each other in the circumferential direction are apart from the position of the rotor magnetic pole S facing the distal end portion 11bc to the position of the rotor magnetic pole S facing the distal end portion 11cc.

In this case, it is preferable that the coil 13 is formed by being wound from the outer circumference side of the teeth 11.

Since it is not required that the root portion 11a of the teeth 11 is apart by one pole portion of the rotor magnetic poles N, S, a large space can be secured on both sides in the circumferential direction of the root portion 11a. When the coil 13 is to be disposed in the space, the wire diameter of the coil 13 can be made large, and the copper loss can be reduced. Also, the space (slot) 15 (15a, 15b) between two distal end portions 11bc, 11cc of the teeth 11 become the ventilation path for the cooling air flowing in the axial direction. According to the present embodiment, the ventilation path 15 becomes narrow and percentage of the range close to the rotor 2 becomes large compared to the structure where the stator iron core 12 is plurally divided in the circumferential direction and respective stator iron cores are made apart from each other as Patent Literature 1. Therefore, the flow speed of the cooling air is increased, the cooling air is made turbulent by the effect of rotation, and cooling performance can be improved. Further, since the stator iron core 12 is not divided and is integral, assembling performance is excellent.

Also, by winding the coil 13 from the outer circumference side of the teeth 11, the coil 13 can be arrayed around the tooth 11 and can be wound neatly, and the space factor of the coil 13 within the slot can be improved after securing the space SPC.

Second Embodiment

Figure 2:
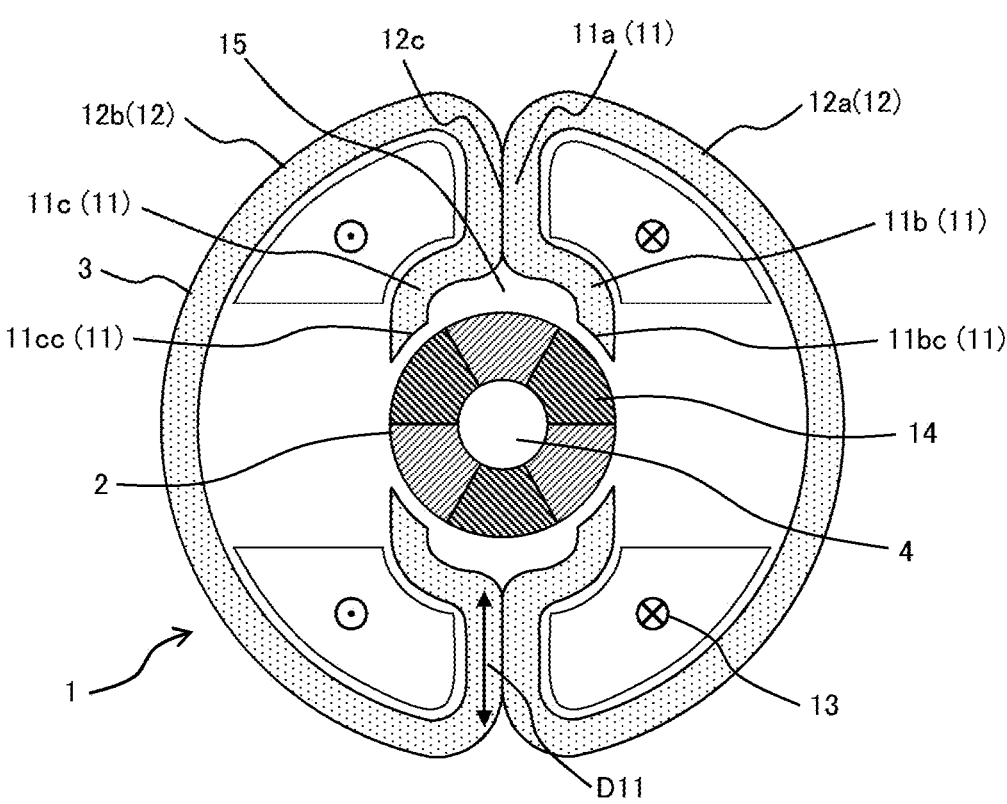
FIG. 2 is a cross-sectional view of a rotary electric machine related to a second embodiment of the present invention.

FIG. 2 illustrates a cross-sectional view of the rotary electric machine 1 related to the second embodiment of the present invention. A configuration similar to that of the first embodiment will be marked with the same reference number as that of the first embodiment, and duplicated explanation thereof will be omitted. Although the rotary electric machine 1 of the present embodiment has a configuration generally the same as that of the first embodiment explained in FIG. 1, the rotary electric machine 1 of the present embodiment is different from the first embodiment in the point that the stator 3 is configured of the stator iron core 12 that is divided into halves in a direction parallel to the tooth 11 at the root portion 11a of the tooth 11.

That is to say, in the single-phase AC rotary electric machine 1 of the present embodiment, the stator iron core 12 is plurally divided into 12a, 12b in the circumferential direction so as to have a division surface 12c parallel to the protruding direction of the tooth 11, the tooth 11 is divided into two in the circumferential direction by the division surface 12c, and one tooth portion and the other tooth portion which are divided into two are arranged in different stator iron core portions 12a, 12b of the stator iron core having been divided into a plural number.

According to the present embodiment, since the stator iron core 12 can be formed by laminating and bending in the laminating direction a ribbon-like material, a low-loss material hard in punching work, for example, an amorphous material or a high-Bs nanocrystalline material can be used, and iron loss can be reduced. Also, since the stator iron core 12 can be formed by bending a laminated material of a certain thickness, the wasted material is reduced compared to that in punching work of a plate material, and the environmental load can be reduced.

Third Embodiment

Figure 3:
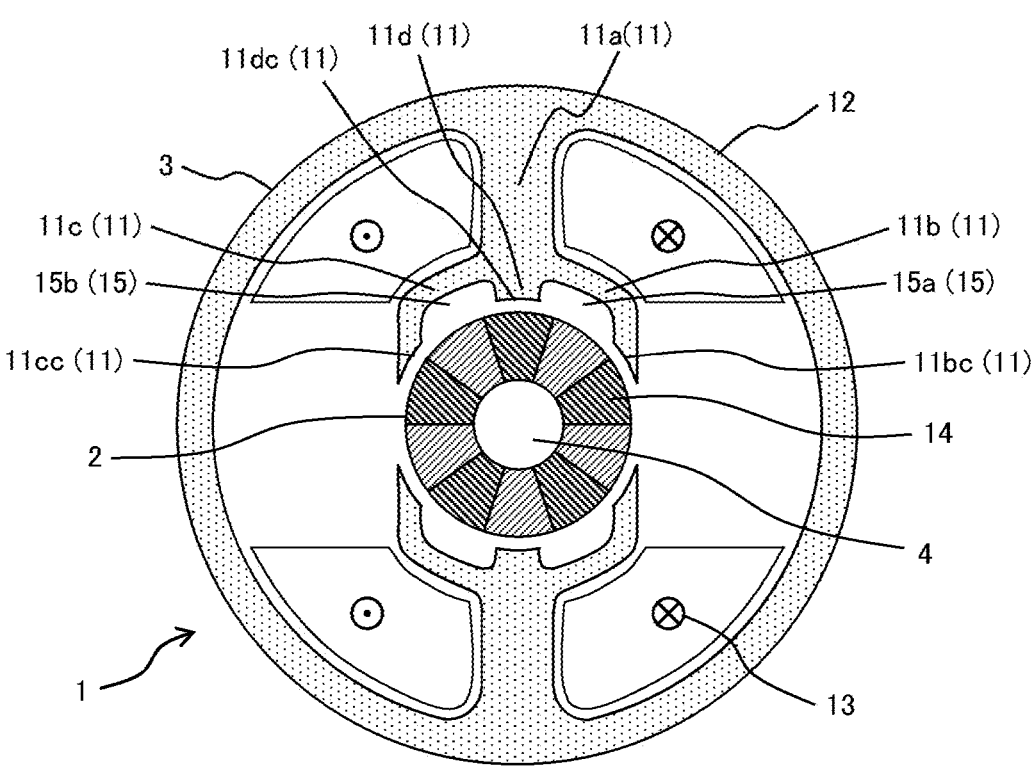
FIG. 3 is a cross-sectional view of a rotary electric machine related to a third embodiment of the present invention.

FIG. 3 illustrates a cross-sectional view of the rotary electric machine 1 related to the third embodiment of the present invention. A configuration similar to that of the first and second embodiments will be marked with the same reference number as that of the first and second embodiments, and duplicated explanation thereof will be omitted.

Although the rotary electric machine 1 of the present embodiment has a configuration generally the same as that of the first embodiment explained in FIG. 1, the rotary electric machine 1 of the present embodiment is different from the first embodiment in the point that the distal end side of the tooth 11 is branched into three, 11b, 11c, 11d, and three distal end portions (stator magnetic pole surfaces) 11bc, 11cc, 11dc are configured.

That is to say, in the single-phase AC rotary electric machine 1 of the present embodiment, the branched portions are branched into three of 11b, 11c, 11d instead of 11b, 11c.

With respect to the distal end portion of the branched portions 11b, 11c, 11d having been branched into three, two distal end portions adjoining each other in the circumferential direction are apart from each other by one pole portion of the rotor magnetic poles N, S.

That is, two distal end portions 11bc, 11cc adjoining each other in the circumferential direction are apart from the position of the rotor magnetic pole S facing the distal end portion 11bc to the position of the rotor magnetic pole S facing the distal end portion 11cc, and two distal end portions 11cc, 11dc adjoining each other in the circumferential direction are apart from the position of the rotor magnetic pole S facing the distal end portion 11cc to the position of the rotor magnetic pole S facing the distal end portion 11dc.

According to the present embodiment, the ratio of the number of the rotor magnetic pole and the number of the stator magnetic pole can be configured by not only 3:2 but also by other combinations, and the degree of freedom of designing is improved. Also, in the present embodiment, the number of the rotor magnetic pole is 10, the number of the stator magnetic pole is 6, and the ratio of the number of the rotor magnetic pole and the number of the stator magnetic pole is 5:3.

Fourth Embodiment

Figure 4:
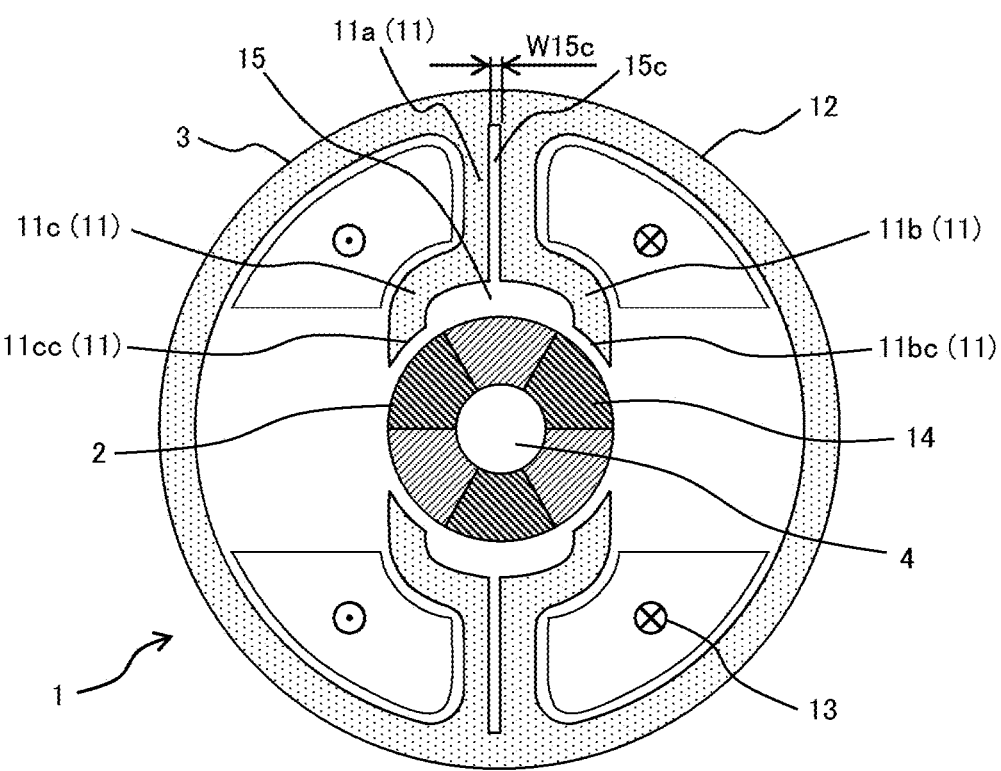
FIG. 4 is a cross-sectional view of a rotary electric machine related to a fourth embodiment of the present invention.

FIG. 4 illustrates a cross-sectional view of the rotary electric machine 1 related to the fourth embodiment of the present invention. A configuration similar to that of the first to third embodiments will be marked with the same reference number as that of the first to third embodiments, and duplicated explanation thereof will be omitted.

Although the rotary electric machine 1 of the present embodiment has a configuration generally the same as that of the first embodiment explained in FIG. 1, the rotary electric machine 1 of the present embodiment is different from the first embodiment in the point that the tooth 11 is branched so as to be apart from each other by a distance W15c that is narrower than one pole portion of the rotor magnetic poles N, S with the exception of the distal end of the tooth 11.

That is to say, in the single-phase AC rotary electric machine 1 of the present embodiment, the tooth 11 has a slit 15c formed toward the outer circumference side in the radial direction from the branched portions 11b, 11c and having the slit width W15c that is narrower than one pole portion of the rotor magnetic poles.

According to the present embodiment, the cooling air can be made to flow also in the vicinity of the root portion 11a of the tooth 11, and cooling performance for the coil 13 disposed in the vicinity of the root portion 11a is improved.

Fifth Embodiment

Figure 5:
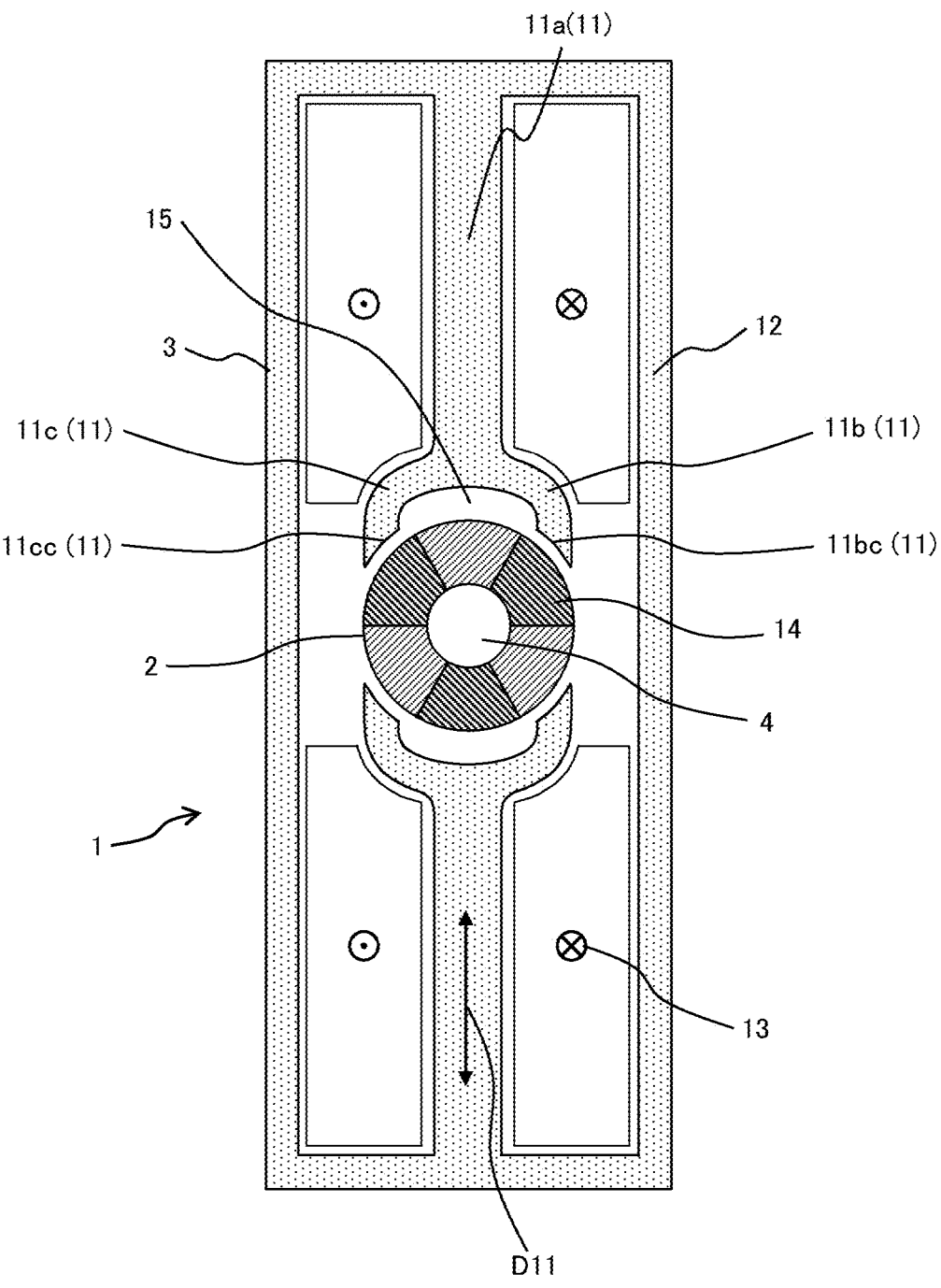
FIG. 5 is a cross-sectional view of a rotary electric machine related to a fifth embodiment of the present invention.

FIG. 5 illustrates a cross-sectional view of the rotary electric machine 1 related to the fifth embodiment of the present invention. A configuration similar to that of the first to fourth embodiments will be marked with the same reference number as that of the first to fourth embodiments, and duplicated explanation thereof will be omitted.

Although the rotary electric machine 1 of the present embodiment has a configuration generally the same as that of the first embodiment explained in FIG. 1, the rotary electric machine 1 of the present embodiment is different from the first embodiment in the point that the stator iron core 12 has a rectangular shape long in the direction parallel to the tooth 11.

That is to say, in the single-phase AC rotary electric machine 1 of the present embodiment, the stator iron core 12 has a rectangular shape whose longitudinal direction is the direction parallel to the protruding direction of the tooth 11.

According to the present embodiment, the stretch length of the coil 13 is shortened, the space where the coil 13 can be disposed can be widened by expanding the space in the longitudinal direction of the rectangular shape, and the copper loss can be reduced.

Sixth Embodiment

Figure 6:
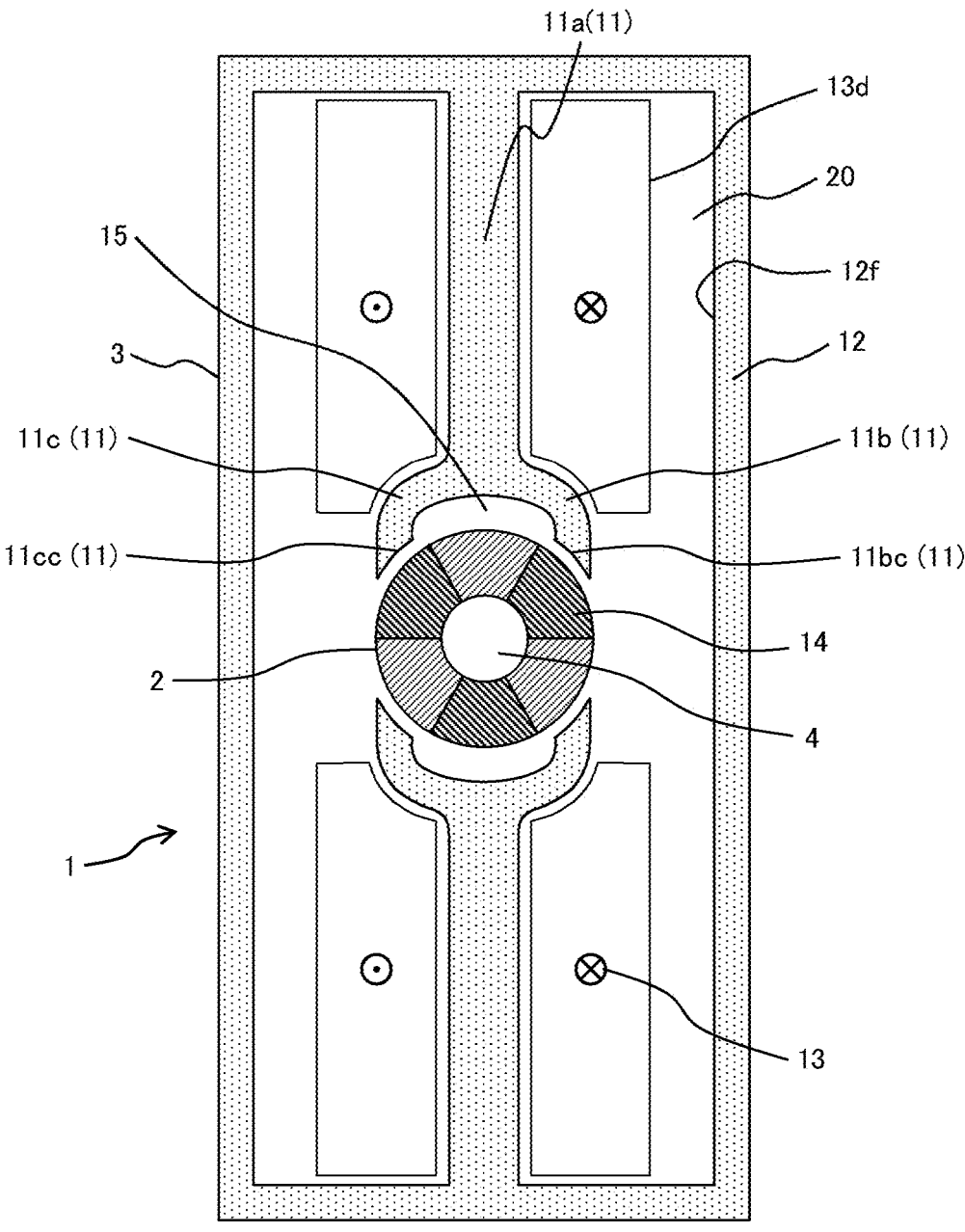
FIG. 6 is a cross-sectional view of a rotary electric machine related to a sixth embodiment of the present invention.

FIG. 6 illustrates a cross-sectional view of the rotary electric machine 1 related to the sixth embodiment of the present invention. A configuration similar to that of the first to fifth embodiments will be marked with the same reference number as that of the first to fifth embodiments, and duplicated explanation thereof will be omitted.

Although the rotary electric machine 1 of the present embodiment has a configuration generally the same as that of the fifth embodiment explained in FIG. 5, the rotary electric machine 1 of the present embodiment is different from the fifth embodiment in the point that a space 20 is arranged between the stator iron core 12 and the outer circumference of the coil 13, and a ventilation path is formed.

That is to say, the single-phase AC rotary electric machine 1 of the present embodiment has the space 20 between an inner circumferential surface 12f of the stator iron core 12 and an outer circumference 13d of the coil 13.

According to the present embodiment, since the outer circumference 13d of the coil 13 can be cooled by the cooling air, cooling performance is improved.

Seventh Embodiment

Figure 7:
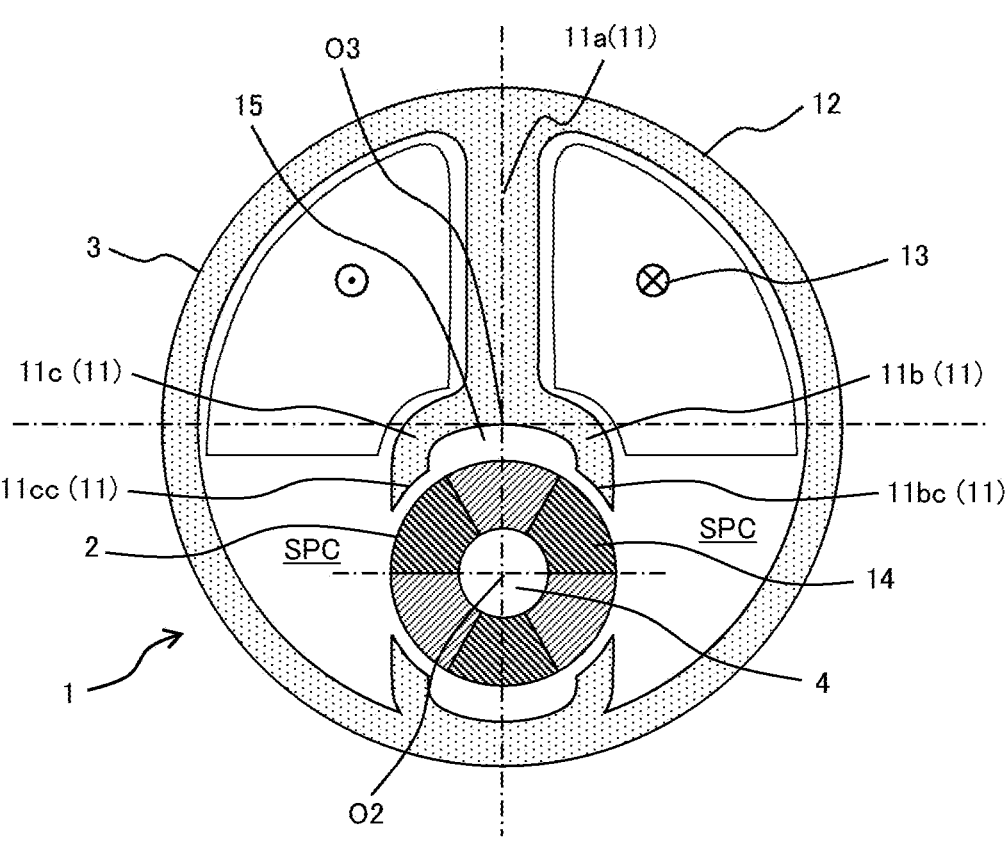
FIG. 7 is a cross-sectional view of a rotary electric machine related to a seventh embodiment of the present invention.

FIG. 7 illustrates a cross-sectional view of the rotary electric machine 1 related to the seventh embodiment of the present invention. A configuration similar to that of the first to sixth embodiments will be marked with the same reference number as that of the first to sixth embodiments, and duplicated explanation thereof will be omitted.

Although the rotary electric machine 1 of the present embodiment has a configuration generally the same as that of the first embodiment explained in FIG. 1, the rotary electric machine 1 of the present embodiment is different from the first embodiment in the point that the stator 3 is configured of the teeth 11 with different length across the center shaft of the rotor 2.

That is to say, in the single-phase AC rotary electric machine 1 of the present embodiment, plural teeth 11 include two teeth disposed across the rotor 2, the teeth 11 having different length in the protruding direction, and the rotor 2 is disposed so that the center O2 thereof shifts from the center O3 of the stator 3.

That is to say, the rotor 2 is disposed eccentrically with respect to the stator 3.

According to the present embodiment, the space SPC for assembling the rotor 2 in assembling can be narrowed, the coil 13 being unable to be disposed in the space SPC. As a result, the space where the coil 13 can be disposed can be widened, and the copper loss can be reduced.

Eighth Embodiment

Figure 8:
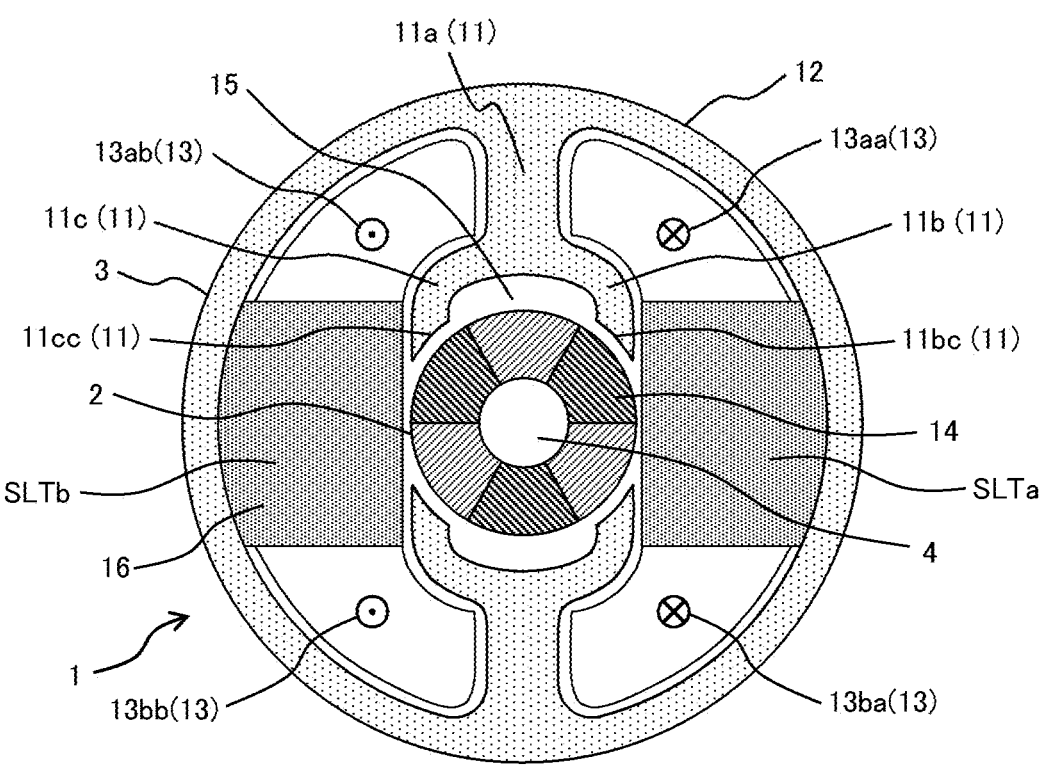
FIG. 8 is a cross-sectional view of a rotary electric machine related to an eighth embodiment of the present invention.

FIG. 8 illustrates a cross-sectional view of the rotary electric machine 1 related to the eighth embodiment of the present invention. A configuration similar to that of the first to seventh embodiments will be marked with the same reference number as that of the first to seventh embodiments, and duplicated explanation thereof will be omitted.

Although the rotary electric machine 1 of the present embodiment has a configuration generally the same as that of the first embodiment explained in FIG. 1, the rotary electric machine 1 of the present embodiment is different from the first embodiment in the point that a blocking material 16 configured of a non-magnetic material is arranged between the coils 13 stored in the same slots SLTa, SLTb. The blocking material 16 is arranged in the space SPC.

That is to say, in the single-phase AC rotary electric machine 1 of the present embodiment, the blocking material 16 is arranged between the coils 13aa and 13ba stored in the same slot SLTa and between the coils 13ab and 13bb stored in the same slot SLTb.

According to the present embodiment, the cooling air is suppressed from flowing between the coils 13 stored in the same slots SLTa, SLTb, the flow speed of the cooling air flowing through the ventilation path 15 rises, and the cooling performance is improved.

Ninth Embodiment

Figure 9:
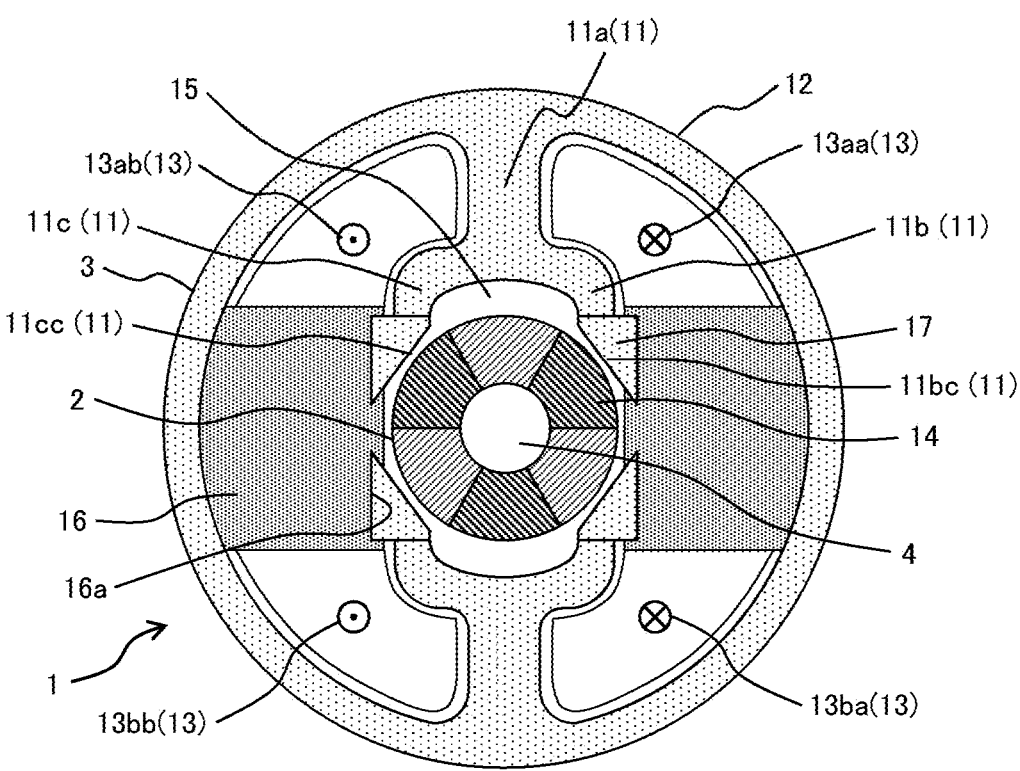
FIG. 9 is a cross-sectional view of a rotary electric machine related to a ninth embodiment of the present invention.

FIG. 9 illustrates a cross-sectional view of the rotary electric machine 1 related to the ninth embodiment of the present invention. A configuration similar to that of the first to eighth embodiments will be marked with the same reference number as that of the first to eighth embodiments, and duplicated explanation thereof will be omitted.

Although the rotary electric machine 1 of the present embodiment has a configuration generally the same as that of the eighth embodiment explained in FIG. 8, the rotary electric machine 1 of the present embodiment is different from the eighth embodiment in the point that a pit (recessed portion) 16*a* is formed on the rotor 2 side of the blocking material 16 configured of a non-magnetic material, and a divided tooth 17 is embedded in and fixed to the pit of the blocking material 16.

That is to say, in the single-phase AC rotary electric machine 1 of the present embodiment, with respect to the tooth 11, the distal end portions 11*bc*, 11*cc* of the branched portions 11*b*, 11*c* are configured of a separate member (divided tooth) 17 separate from the branched portions 11*b*, 11*c*, and the distal end portions 11*bc*, 11*cc* configured of the separate member 17 are embedded in and fixed to recessed portions 16*a* formed in the blocking material 16.

According to the present embodiment, the divided tooth 17 can be formed by cutting work of a ribbon-like material. Thus, a low-loss material hard in punching work, for example, an amorphous material or a high-Bs nanocrystalline material can be used for the divided tooth 17, and iron loss of the distal end of the tooth where the magnetic flux largely changes can be reduced.

Tenth Embodiment

Figure 10:
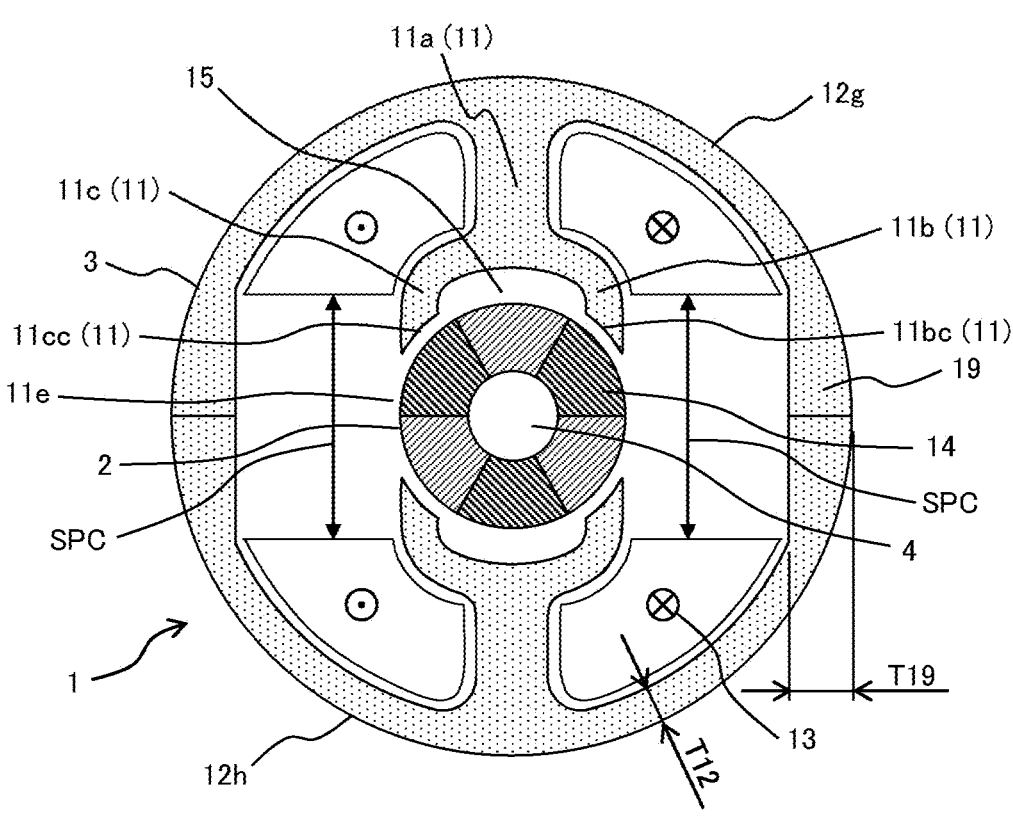
FIG. 10 is a cross-sectional view of a rotary electric machine related to a tenth embodiment of the present invention.

FIG. 10 illustrates a cross-sectional view of the rotary electric machine 1 related to the tenth embodiment of the present invention. A configuration similar to that of the first to ninth embodiments will be marked with the same reference number as that of the first to ninth embodiments, and duplicated explanation thereof will be omitted.

Although the rotary electric machine 1 of the present embodiment has a configuration generally the same as that of the first embodiment explained in FIG. 1, the rotary electric machine 1 of the present embodiment is different from the first embodiment in the point that the stator 3 is configured of divided iron cores 12*g*, 12*h* divided on the outer circumference side of a slot opening portion 11*e*, and a width T19 of an iron core joint portion 19 joining the divided iron cores 12*g*, 12*h* is wider than the portions other than the iron core joint portion 19.

That is to say, in the single-phase AC rotary electric machine 1 of the present embodiment, with respect to the tooth 11, plural teeth 11 are configured of two teeth 11 disposed across the rotor 2, the stator iron core 12 is divided into two of 12*g*, 12*h* at circumferential direction intermediate portions configured between two teeth 11, and the thickness T19 at the joint portion 19 of the stator iron cores 12*g*, 12*h* divided into two is thicker than a thickness T12 of other portions.

According to the present embodiment, since the stator iron core 12 is configured of the divided iron cores 12*g*, 12*h*, the production efficiency of the rotary electric machine 1 can be improved, and since the width T19 of the iron core joint portion 19 is large, the magnetic resistance of the gap between the divided iron cores 12*g*, 12*h* caused by dividing of the stator iron core 12 is reduced, and deterioration of the output performance of the rotary electric machine 1 caused by dividing of the iron core 12 can be suppressed.

The present invention is not limited to the above-described embodiments, and further includes various modifications. For example, the above-described embodiments have been described in detail in order to facilitate the understanding of the present invention, and the present invention is not necessarily limited to those including all of the described configurations. In addition, part of the configuration of one example can be replaced with the configurations of other examples, and in addition, the configuration of the one example can also be added with the configurations of other examples. In addition, part of the configuration of each of the examples can be subjected to addition, deletion, and replacement with respect to other configurations.

LIST OF REFERENCE SIGNS

1: rotary electric machine, 2: rotor, 3: stator, 4: shaft, 11: tooth, 11*b*, 11*c*, 11*d*: branched portion of tooth 11, 11*bc*, 11*cc*, 11*dc*: distal end portion of branched portion 11*b*, 11*c*, 12: stator iron core, 12*a*, 12*b*: divided stator iron core portion, 12*c*: division surface of stator iron core 12, 12*f*: inner circumferential surface of stator iron core 12, 12*g*, 12*h*: stator iron core divided into two, 13, 13*aa*, 13*ab*, 13*ba*, 13*bb*: coil, 13*d*: outer circumference of coil 13, 14: magnet, 15: slot (ventilation path), 15*c*: slit (ventilation path), 16: blocking material, 16*a*: recessed portion formed in blocking material 16, 17: divided tooth (separate member), 18: divided iron core, 19: joint portion of stator iron core 12, G: gap, N, S: rotor magnetic pole, O2: center of rotor 2, O3: center of stator 3, SLTa, SLTb: slot, T19: thickness of joint portion 19, T12: thickness of other portions of stator iron core 12, W15*c*: slit width

The invention claimed is:

1. A single-phase AC rotary electric machine, comprising:
a rotor; and
a stator disposed such that a gap in a radial direction is present between the rotor and the stator,
wherein
the rotor includes a plurality of magnets forming rotor magnetic poles disposed in a circumferential direction,
the stator includes a stator iron core, a plurality of teeth disposed in the stator iron core, and coils wound around the teeth,
the tooth includes branched portions whose distal end side facing the rotor magnetic poles is branched plurally in the circumferential direction, and
in the distal portions of the branched portions branched plurally, two distal portions adjoining each other in the circumferential direction are apart from each other by one pole portion of the rotor magnetic poles.

2. The single-phase AC rotary electric machine according to claim 1, wherein
the stator iron core is divided plurally in the circumferential direction so as to have a division surface parallel to the protruding direction of the tooth,
the tooth is divided into two in the circumferential direction by the division surface, and
the two teeth portions divided into the one tooth portion and the other tooth portion are arranged at different stator iron core portion of the plurally divided stator iron core.

3. The single-phase AC rotary electric machine according to claim 1, wherein
the branched portion is branched into three.

4. The single-phase AC rotary electric machine according to claim 1, wherein
the tooth has a slit that is formed toward the outer circumference side in the radial direction from the branched portion and that has a slit width narrower than one pole portion of the rotor magnetic pole.

5. The single-phase AC rotary electric machine according to claim 1, wherein the stator iron core has a rectangular shape having the longitudinal direction in a direction parallel to the protruding direction of the tooth.

6. The single-phase AC rotary electric machine according to claim 5, wherein a space is provided between the inner circumferential surface of the stator iron core and the outer circumference of the coil.

7. The single-phase AC rotary electric machine according to claim 1, wherein the plurality of teeth include two teeth disposed across the rotor and having length in the protruding direction being different from each other, and the rotor is disposed so that the center of the rotor shifts from the center of the stator.

8. The single-phase AC rotary electric machine according to claim 1, wherein a blocking material is disposed between coils stored in the same slot.

9. The single-phase AC rotary electric machine according to claim 8, wherein a distal end portion of the branched portion of the tooth is configured of a separate member that is separate from the branched portion, and the distal end portion configured of a separate member is embedded in and fixed to a recessed portion formed in the blocking material.

10. The single-phase AC rotary electric machine according to claim 1, wherein a plurality of the teeth are configured of two teeth disposed across the rotor, the stator iron core is divided into two at circumferential direction intermediate portions formed between the two teeth, and a thickness at a joint portion of the stator iron cores divided into two is thicker than thickness of other portions.

\* \* \* \* \*